United States Patent [19]

Han et al.

[11] Patent Number: 5,753,814
[45] Date of Patent: May 19, 1998

[54] MAGNETICALLY-OSCILLATED PROBE MICROSCOPE FOR OPERATION IN LIQUIDS

[75] Inventors: Wenhai Han; Stuart M. Lindsay, both of Tempe, Ariz.; Steven K. Harbaugh, Castro Valley, Calif.; Tianwei Jing, Tempe, Ariz.

[73] Assignee: Molecular Imaging Corporation, Tempe, Ariz.

[21] Appl. No.: 722,344

[22] Filed: Sep. 27, 1996

Related U.S. Application Data

[63] Continuation-in-part of Ser. No. 710,191, Sep. 12, 1996, which is a continuation-in-part of Ser. No. 553,111, Nov. 7, 1995, Pat. No. 5,612,491, which is a division of Ser. No. 403,238, Mar. 10, 1995, Pat. No. 5,513,518, which is a continuation-in-part of Ser. No. 246,035, May 19, 1994, Pat. No. 5,515,719.

[51] Int. Cl.$^6$ ........................................ G01B 5/28
[52] U.S. Cl. ........................................ 73/105
[58] Field of Search ........................... 73/105; 750/306, 750/307

[56] References Cited

U.S. PATENT DOCUMENTS

| | | |
|---|---|---|
| Re. 33,387 | 10/1990 | Binnig . |
| Re. 34,331 | 8/1993 | Elings et al. . |
| Re. 34,489 | 12/1993 | Hansma et al. . |
| 4,343,993 | 8/1982 | Binnig et al. . |
| 4,422,002 | 12/1983 | Binnig et al. . |
| 4,520,570 | 6/1985 | Bednorz et al. . |
| 4,668,865 | 5/1987 | Gimzewski et al. . |
| 4,724,318 | 2/1988 | Binnig . |
| 4,785,177 | 11/1988 | Beocke . |
| 4,800,274 | 1/1989 | Hansma et al. . |
| 4,806,755 | 2/1989 | Duerig et al. . |
| 4,823,004 | 4/1989 | Kaiser et al. . |
| 4,837,435 | 6/1989 | Sakuhara et al. . |
| 4,866,271 | 9/1989 | Ono et al. . |

(List continued on next page.)

FOREIGN PATENT DOCUMENTS

| | | |
|---|---|---|
| 63-85461 | 4/1988 | Japan . |
| 05-203626 | 8/1993 | Japan . |
| 06-59004 | 3/1994 | Japan . |

OTHER PUBLICATIONS

Jarvis et al., "A Novel Force Microscope and Point Contact Probe", Rev. Sci. Instrum., vol. 64, No. 12, Dec. 1993, pp. 3515–3520.

Lindsay et al., "Scanning Tunneling Microscopy and Atomic Force Microscopy Studies of Biomaterials at a Liquid–Solid Interface", J. Vac. Sci. Technol., vol. 11, No. 4, Jul./Aug. 1993, pp. 808–815.

Jung, P.S., et al., "Novel Stationary–Sample Atomic Force Microscope with Beam–Tracking Lens", Electronics Letters, Feb. 4, 1993, vol. 29, No. 3, pp. 264–265.

(List continued on next page.)

*Primary Examiner*—Hezron E. Williams
*Assistant Examiner*—Daniel S. Larkin
*Attorney, Agent, or Firm*—Killworth, Gottman, Hagan & Schaeff, L.L.P.

[57] ABSTRACT

In accordance with a first aspect of the present invention, the sensitivity of a magnetically modulated AC-AFM is substantially improved by the use of a ferrite-core solenoid for modulating the magnetic cantilever of the ACAFM. In accordance with a second aspect of the present invention, the detection system for a magnetically modulated AC-AFM incorporates AC coupling of the signal from the position sensitive detector/beam deflection detector in order to remove the DC component of the signal, resulting in significantly improved dynamic range over systems utilizing DC coupling. High frequency modulation signals are detected through the use of fast analog multipliers which, after active filtering, give a low frequency signal which may be processed by digital electronics. In accordance with a third aspect of the present invention, operation of the microscope at small amplitudes of oscillation leaves small asperities on the tip intact and results in dramatic improvement in resolution.

18 Claims, 7 Drawing Sheets

U.S. PATENT DOCUMENTS

| | | |
|---|---|---|
| 4,868,396 | 9/1989 | Lindsay . |
| 4,871,938 | 10/1989 | Elings et al. . |
| 4,877,957 | 10/1989 | Okada et al. . |
| 4,889,988 | 12/1989 | Elings et al. . |
| 4,902,892 | 2/1990 | Okayama et al. . |
| 4,914,293 | 4/1990 | Hayashi et al. . |
| 4,924,091 | 5/1990 | Hansma et al. . |
| 4,935,634 | 6/1990 | Hansma et al. . |
| 4,947,042 | 8/1990 | Nishioka et al. . |
| 4,952,857 | 8/1990 | West et al. . |
| 4,954,704 | 9/1990 | Elings et al. . |
| 4,956,817 | 9/1990 | West et al. . |
| 4,962,480 | 10/1990 | Ooumi et al. . |
| 4,968,390 | 11/1990 | Bard et al. . |
| 4,968,914 | 11/1990 | West et al. . |
| 4,969,978 | 11/1990 | Tomita et al. . |
| 4,992,659 | 2/1991 | Abraham et al. . |
| 4,992,728 | 2/1991 | McCord et al. . |
| 4,999,494 | 3/1991 | Elings . |
| 4,999,495 | 3/1991 | Miyata et al. . |
| 5,003,815 | 4/1991 | Martin et al. . |
| 5,009,111 | 4/1991 | West et al. . |
| 5,017,010 | 5/1991 | Mamin et al. . |
| 5,018,865 | 5/1991 | Ferrell et al. . |
| 5,025,658 | 6/1991 | Elings et al. . |
| 5,047,633 | 9/1991 | Finlan et al. . |
| 5,051,646 | 9/1991 | Elings et al. . |
| 5,066,858 | 11/1991 | Elings et al. . |
| 5,077,473 | 12/1991 | Elings et al. . |
| 5,081,390 | 1/1992 | Elings . |
| 5,103,095 | 4/1992 | Elings et al. . |
| 5,107,113 | 4/1992 | Robinson . |
| 5,107,114 | 4/1992 | Nishioka et al. . |
| 5,117,110 | 5/1992 | Yasutake . |
| 5,120,959 | 6/1992 | Tomita . |
| 5,141,319 | 8/1992 | Kajimura et al. . |
| 5,142,145 | 8/1992 | Yasutake . |
| 5,144,833 | 9/1992 | Amer et al. . |
| 5,155,361 | 10/1992 | Lindsay . |
| 5,155,715 | 10/1992 | Ueyema et al. . |
| 5,157,251 | 10/1992 | Albrecht et al. . |
| 5,166,516 | 11/1992 | Kajimura . |
| 5,168,159 | 12/1992 | Yagi . |
| 5,189,906 | 3/1993 | Elings et al. . |
| 5,196,713 | 3/1993 | Marshall . |
| 5,198,715 | 3/1993 | Elings et al. . |
| 5,202,004 | 4/1993 | Kwak et al. . |
| 5,204,531 | 4/1993 | Elings et al. . |
| 5,206,702 | 4/1993 | Kato et al. . |
| 5,210,410 | 5/1993 | Barrett . |
| 5,224,376 | 7/1993 | Elings et al. . |
| 5,229,606 | 7/1993 | Elings et al. . |
| 5,231,286 | 7/1993 | Kajimura et al. . |
| 5,237,859 | 8/1993 | Elings et al. . |
| 5,253,516 | 10/1993 | Elings et al. . |
| 5,257,024 | 10/1993 | West . |
| 5,258,107 | 11/1993 | Yoshida et al. . |
| 5,260,567 | 11/1993 | Kuroda et al. . |
| 5,260,622 | 11/1993 | West . |
| 5,260,824 | 11/1993 | Okada et al. . |
| 5,262,643 | 11/1993 | Hammond et al. . |
| 5,266,801 | 11/1993 | Elings et al. . |
| 5,266,896 | 11/1993 | Rugar et al. . |
| 5,266,897 | 11/1993 | Watanuki et al. . |
| 5,267,471 | 12/1993 | Abraham et al. . |
| 5,274,230 | 12/1993 | Kajimura et al. . |
| 5,276,324 | 1/1994 | Ohtaki et al. . |
| 5,280,341 | 1/1994 | Nonnemacher et al. . |
| 5,283,437 | 2/1994 | Grescher et al. . |
| 5,283,442 | 2/1994 | Martin et al. . |
| 5,286,977 | 2/1994 | Yokoyama et al. . |
| 5,289,004 | 2/1994 | Okada et al. . |
| 5,291,775 | 3/1994 | Gamble et al. . |
| 5,293,042 | 3/1994 | Miyamoto . |
| 5,294,804 | 3/1994 | Kajimura . |
| 5,296,704 | 3/1994 | Mishima et al. . |
| 5,298,975 | 3/1994 | Khoury et al. . |
| 5,304,924 | 4/1994 | Yamano et al. . |
| 5,306,919 | 4/1994 | Elings et al. . |
| 5,307,693 | 5/1994 | Griffith et al. . |
| 5,308,974 | 5/1994 | Elings et al. . |
| 5,314,254 | 5/1994 | Yashar et al. . |
| 5,314,829 | 5/1994 | Coles . |
| 5,317,153 | 5/1994 | Matshshiro et al. . |
| 5,319,960 | 6/1994 | Gamble et al. . |
| 5,319,977 | 6/1994 | Quate et al. . |
| 5,321,977 | 6/1994 | Clabes et al. . |
| 5,323,003 | 6/1994 | Shido et al. . |
| 5,324,935 | 6/1994 | Yasutake . |
| 5,325,010 | 6/1994 | Besocke et al. . |
| 5,329,808 | 7/1994 | Elings et al. . |
| 5,331,589 | 7/1994 | Gambino et al. . |
| 5,338,932 | 8/1994 | Theodore et al. . |
| 5,354,985 | 10/1994 | Quate . |
| 5,357,105 | 10/1994 | Harp et al. . |
| 5,360,977 | 11/1994 | Masatoshi et al. . |
| 5,381,101 | 1/1995 | Bloom et al. . |
| 5,388,452 | 2/1995 | Harp et al. . |
| 5,438,206 | 8/1995 | Yokoyama et al. . |
| 5,461,907 | 10/1995 | Tench et al. ................... 73/105 |
| 5,468,959 | 11/1995 | Tohda et al. ................. 73/105 X |
| 5,481,521 | 1/1996 | Washizawa et al. . |
| 5,497,000 | 3/1996 | Tao et al. . |
| 5,513,518 | 5/1996 | Lindsay ........................ 73/105 |
| 5,515,719 | 5/1996 | Lindsay ........................ 73/105 |

OTHER PUBLICATIONS

Joyce, Stephen A., et al., "Mechanical Relaxation of Organic Monolayer Films Measured by Force Microscopy", Physical Review Letters, May 4, 1992, vol. 68, No. 18, pp. 2790–2793.

Binnig, G., et al., "Single–tube three–dimensional scanner for scanning tunneling microscopy", Review of Scientific Instruments, Aug. 1986, vol. 57, No. 8, pp. 1688–1689.

Drake, B., et al., "Imaging Crystals, Polymers, and Processes in Water with the Atomic Force Microscope", Science, vol. 243, pp. 1586–1589.

Sonnenfeld, Richard, et al., "Atomic–Resolution Microscopy in Water", Science, Apr. 11, 1986, vol. 232, pp. 211–213.

Davidsson, P., et al., "A new symmetric scanning tunneling microscope design", Journal of Vacuum Science & Technology: Part A, Mar./Apr. 1988, No. 2, pp. 380–382.

Marti, O., et al., "Atomic force microscopy of liquid–covered surfaces: Atomic resolution images", Applied Physics Letters, Aug. 17, 1987, vol. 51, No. 7, pp. 484–486.

Kirk, M. D., et al., "Low–temperature atomic force microscopy", Review of Scientific Instruments, Jun. 1988, vol. 59, No. 6, pp. 833–835.

Sonnenfeld, Richard, et al., "Semiconductor topography in aqueous environments: Tunneling microscope of chemomechanically polished (001) GaAs", Applied Physics Letters, Jun. 15, 1987, vol. 50, No. 24, pp. 1742–1744.

Chalmers, S.A., et al., "Determination of tilted superlattice structure by atomic force microscopy", Applied Physics Letters, Dec. 11, 1989, vol. 55, No. 24, pp. 2491–2493.

West, Paul, et al., "Chemical applications of scanning tunneling microscopy", IBM Joint Research Development, Sep. 1986, vol. 30, No. 5, p. 484490.

Kramar, John Adam, "Candicacy Report", May 21, 1985.

Mate, C. Mathew, et al., "Determination of Lubricant Film Thickness on a Particulate Disk Surface by Atomic Force Microscopy", IBM Research Division, Research Report.

Martin, Y., et al., "Atomic force microscope–force mapping and profiling on a sub 100-Å scale", Journal of Applied Physics, May 15, 1987, vol. 61, No. 10, pp. 4723–4729.

Damaskin, B.B., et al., "The Adsorption of Organic Molecules", Comprehensive Treatise of Electrochemistry, vol. 1: The Double Layer, pp. 353–395.

Travaglini, G., et al., "Scanning Tunneling Microscopy on a Biological Matter", Surface Science, 1987, vol. 181, pp. 380–390.

Ohnesorge, F., et al., "True Atomic Resolution by Atomic Force Microscopy Through Repulsive and Attractive Forces", Science, Jun. 4, 1993, vol. 260, pp. 1451–1456.

Melmed, Allan J., "The art and science and other aspects of making sharp tips", Journal of Vacuum Science & Technology, Mar./Apr. 1991, vol. B9, No. 2, pp. 601–608.

Musselman, Inga Holl, et al., "Platinum/iridium tips with controlled geometry for scanning tunneling microscopy", Journal of Vacuum Science & Technology, Jul./Aug. 1990, vol. 8, No. 4, pp. 3558–3562.

Ibe, J. P., et al., "On the electrochemical etching of tips for scanning tunneling microscopy", Journal of Vacuum Science & Technology, Jul./Aug. 1990, vol. 8, No. 4, pp. 3570–3575.

Nagahara, L. A., "Preparation and characterization of STM tips for electrochemical studies", Review of Scientific Instruments, Oct. 1989, vol. 60, No. 10, pp. 3128–3130.

Specht, Martin, et al., "Simultaneous measurement of tunneling current and force as a function of position through a lipid film on a solid substrate", Surface Science Letters, 1991, vol. 257, pp. L653–L–658.

Brede, M., et al., "Brittle crack propagation in silicon single crystals", Journal of Applied Physics, Jul. 15, 1991, vol. 70, No. 2, pp. 758–771.

Hu, S.M., "Stress–related problems in silicon technology", Journal of Applied Physics, Sep. 15, 1991, vol. 70, No. 6, pp. R53–R80.

Hansma, P.K., et al., Article (untitled) from Journal of Applied Physics, Jul. 15, 1994, vol. 76, No. 2, pp. 796–799.

Mazur, Ursula, et al., "Resonant Tunneling Bands and Electrochemical Reduction Potentials" Journal of Physical Chemistry.

O'Shea, S.J., et al., "Atomic force microscopy of local compliance at solid–liquid interfaces"..

Putman, Constant A.J., et al., "Viscoelasticity of living cells allows high–resolution imaging by tapping mode atomic force microscopy".

Grigg, D.A., et al., "Tip–sample forces in scanning probe microscopy in air and vacuum", Journal of Vacuum Science Technology, Jul./Aug. 1992, vol. 10, No. 4, pp. 680–683.

Stewart, A.M., et al., "Use of magnetic forces to conttol distance in a surface force apparatus".

Marti, O., et al., "Control electronics for atomic force microscopy", Review of Scientific Instruments, Jun. 1988, vol. 59, No. 6, pp. 836–839.

5,753,814

MAGNETICALLY-OSCILLATED PROBE MICROSCOPE FOR OPERATION IN LIQUIDS

CROSS REFERENCE TO RELATED APPLICATION

This application is a continuation-in-part of United States patent application Ser. No. 08/701,191 filed 12 Sep. 1996 (DOCKET NO. MICO029) in the name of inventors Wenhai Han, Stuart M. Lindsay and Tianwei Jing, which is, in turn, a continuation-in-part of United States Patent Application Serial No. 08/553,111 filed 7 Nov. 1995 in the name of inventor Stuart M. Lindsay, now U.S. Pat. No. 5,612,491, which is, in turn, a division of United States patent application Ser. No. 08/403,238 filed 10 Mar. 1995 in the name of inventor Stuart M. Lindsay, now U.S. Pat. No. 5,513,518, which is, in turn, a continuation-in-part of United States patent application Ser. No. 08/246,035 filed 19 May 1994 in the name of inventor Stuart M. Lindsay, now United States Pat. No. 5,515,719. The disclosures of each of the foregoing are hereby incorporated herein by reference as if set forth in full herein.

BACKGROUND OF THE INVENTION

1. Field of the Invention

This invention relates to the field of scanning probe microscopy. More particularly, this invention relates to an oscillating-probe atomic force microscope.

2. The Prior Art

The field of scanning probe microscopy involves using probes having sharp points to interact with and therefore permit the measurement of characteristics of a sample surface as the probes are scanned over the sample surface. The scanning tunneling microscope (STM), can image the surface of a conductive material by passing a tunneling electron current from a sharp conductive probe to the surface. A small bias voltage is applied between the tip of the sharp conductive probe and the surface. The amount of resulting "tunneling" current indicates the proximity of the surface to the probe tip. This current decreases exponentially as the tip to sample surface distance increases. Variations in the tunneling current are indicative of the shape of the surface because as the probe is scanned over the surface at a given altitude, if the surface approaches the tip of the probe, the tunneling current will increase, and if it dips away, the current will decrease.

The atomic force microscope (AFM) was discovered shortly after the STM. An AFM, while in the class of scanning probe microscopes, operates on a completely different principle from the STM. In an AFM, a flexible cantilever having a sharp pointed probe tip at the free end of the cantilever is moved relative to a sample surface to be scanned or imaged. An atomic force of attraction (the Van der Waals force) tends to pull the probe tip toward the surface. As the tip approaches the surface, the net force acting on the tip drops and becomes repulsive after the tip reaches a certain proximity to the surface. This repulsive force is due to the positively charged nuclei of the respective atoms of the surface and the probe tip electrostaticly repelling one another. This force is measured in one of a number of ways and provides the signal from which an image of the surface of the sample under investigation is formed. AFMs are advantageous over STMs because the surface of the sample need not be electrically conductive or made so. Atomic force microscopy is particularly well suited to imaging the surfaces of biological materials including DNA and similar chemicals. It is also readily adapted to use within chemicals such as water and electrolytes.

A control system using feedback is generally used in scanning probe microscopes in order to control the height, Z, of the probe over the sample surface.

Z-axis control may be implemented by adding a Z-axis component to the X–Y piezoelectric scanning cylinder described below, or by adding separate Z-axis control to the sample where X–Y axis control is provided to the probe, or vice versa. The STM may use a current to voltage amplifier to convert the tunneling current to a suitable voltage. The AFM may generate a voltage in a number of ways representative of probe height, such as by reflecting a laser beam off of the probe to measure deflection of the beam (and hence, the probe) with a position sensitive detector. This voltage may then be subtracted from a constant voltage signal referred to as the setpoint signal. This setpoint signal establishes a fixed separation distance from the tip to the sample surface during the scan.

The sample or the probe may be attached to a motion controlling device, typically a piezoelectric cylinder, which may be used to scan or move the sample (or the probe) back and forth in the X and Y directions to create a relative rastering motion between the probe tip and sample surface.

A feedback conditioner may then be employed to control the probe tip to sample surface distance. The feedback may be either an analog circuit or a digital circuit using computing means such as is described by Hanselmann in "Implementation of Digital Controllers—A Survey" Automatica, Vol. 23 No 1, 1987.

The difference signal between the setpoint signal and the detector signal is typically referred to as the error signal. The error signal is in turn routed to the feedback circuitry. The signal resulting from the feedback circuitry is referred to as the control signal.

The control signal is then routed to the motion control device such that the control device keeps the tunneling tip at a constant distance from the surface. Consequently, the distance between the probe tip and the sample surface remains essentially constant even though the topography of the sample is changing under the probe tip.

The correction signal is also an indication of the surface profile. The correction signal may also be filtered or conditioned to produce a second signal which can enhance certain surface profile features.

Such systems provide X and Y raster signals and a Z signal indicating the surface profile. These three signals are sufficient to give surface topographical information. Such signals thus generated can be digitized and displayed by a computer with the topography displayed in various representations, as desired.

It is often desirable to operate an AFM in an oscillating mode. In this mode (referred to herein as the "AC-AFM" mode), the cantilever is vibrated at a high frequency (typically in the range of about 1 kHz to about 100 kHz), and the change in amplitude (or phase of oscillation relative to the exciting signal) of the cantilever as it approaches a sample surface is used to control the microscope as described, for example, in "Frequency Modulation Detection Using High-Q Cantilevers for Enhanced Force Microscopy Sensitivity", T. R. Albrecht, P. Grütter, D. Horne and D. Rugar, Journal of Applied Physics, Vol. 69, pp. 668–673 (1991). One reason for doing this is because, when oscillated at high amplitude (typically in the range of about 200 nm to about 1000 nm), the probe is less likely to stick to the surface under study or to cause distortion to the sample being studied. See, e.g., "Fractured Polymer/Silica Fibre Surface Studied by Tapping Mode Atomic Force Microscopy", Q. Zhong, D. Inniss, K. Kjoller and V. B. Elings, Surface Science Letters, Vol. 290, pp. L688–L692 (1993). However, the AC mode of operation is also intrinsically more sensitive. AC detection shifts the signal to be detected to sidebands on a carrier signal, avoiding the low frequency noise that DC signals suffer from. In addition, the mechanical Q of a cantilever's resonance can be used to enhance the overall signal to noise ratio of a microscope operated this way as taught by Albrecht et al., supra.

In one version of an AC-AFM described in United States Pat. Nos. 5,412,980 and 5,519,212 to Elings, et al., the oscillation of the probe tip is used 10 mainly as a means of avoiding the effects of adhesion between the probe tip and the surface under study. However, such adhesion is easily avoided by chemical means. For example, the microscope may be operated in a fluid which minimizes adhesion. Alternatively (or additionally) a tip material can be chosen so as to minimize its adhesion to the surface under study. In that case, there is no reason to operate the microscope at a large amplitude of oscillation (i.e., exceeding 200 nm).

The usual method of exciting motion in the AFM cantilever is to drive it with an acoustic excitation. This method works well in air or gas and has been made to work with the tip submerged in water as suggested, for example, in "Tapping Mode Atomic Force Microscopy in Liquids", P. K. Hansma, J. P.

Cleveland, M. Radmacher, D. A. Walters, P. E. Hilner, M. Bezanilla, M. Fritz, D. Vie, H. G. Hansma, C. B. Prater, J. Massie, L. Fukunaga, J. Gurley and V. B. Elings, Applied Physics Letters, Vol. 64, pp. 1738–1740 (1994) and "Tapping Mode Atomic Force Microscopy in Liquid", C. A. J. Putman, K. O. V. d. Werf, B. G. deGrooth, N. F. V. Hulst and J. Greve, Applied Physics Letters, Vol. 64, pp. 2454–2456 (1994)). In a fluid, however, the motions of an AFM cantilever are viscously damped, so that substantial acoustic amplitude is required to drive motion of the cantilever. Furthermore, the fluid acts as a coupling medium between the source of acoustic excitation and parts of the microscope other than the cantilever. The result is that parts of the microscope other than the cantilever get excited by the acoustic signal used to vibrate the cantilever. If these motions lead to a signal in the detector, a background signal is generated which is spurious and not sensitive to the interaction between the tip and surface. This problem is discussed in "Atomic Force Microscope with Magnetic Force Modulation", E. L. Florin, M. Radmacher, B. Fleck and H. E. Gaub, Review of Scientific Instruments, Vol. 65, pp. 639–643 (1993).

Lindsay and co-workers have described a scheme for exciting the cantilever directly through magnetic interaction. "Scanning Tunneling Microscopy and Atomic Force Microscopy Studies of Biomaterials at a Liquid - Solid Interface", S. M. Lindsay, Y. L. Lyubchenko, N. J. Tao, Y. Q. Li, P. I. Oden, J. A. DeRose and J. Pan, Journal of Vacuum Science Technology A, Vol. 11, pp. 808–815 (July/August 1993). In this approach, a magnetic particle or film is attached to the AFM cantilever and a solenoid near the cantilever is used to generate a magnetic force on the cantilever. This arrangement gives extreme sensitivity to surface forces, see, e.g., "Atomic Force Microscopy of Local Compliance at Solid - Liquid Interfaces", S. J. O'Shea, M. E. Welland and J. B. Pethica, Chemical Physical Letters, Vol. 223, pp. 336–340 (1994), presumably because of a lack of background spurious signal as would occur in an acoustically-excited microscope.

Florin et al. (Florin et al., supra) have used a direct drive to the microscope tip in order to make local-indentation measurements of the surface compliance. In the Florin et al. microscope, the tip was left in contact with a surface in ambient-air, and an oscillating force applied so as to push the tip into the surface, generating a response proportional to the local compliance of the surface.

In United States Pat. No. 5,515,719 to Lindsay entitled "Controlled Force Microscope for Operation in Liquids" and United States Pat. No. 5,513,518 to Lindsay entitled "Magnetic Modulation of Force Sensor for AC detection in an Atomic Force Microscope", the use of direct drive applied to the tip as a means of exciting motion in the tip was described. According to the invention, the tip is scanned over a surface and changes in this motion are used to determine local topography. It is much like the non-contact (Albrecht et al., supra) microscopy or tapping-mode microscopy (Zohng et al., supra) except that the tip is driven directly by magnetic means as opposed to being excited by an acoustic wave.

The direct drive is beneficial both when the oscillating tip physically contacts the surface and when it interacts only indirectly through long-range forces. Even when the tip is in contact with the surface throughout the cycle over which a driving force is applied, the direct drive offers the advantage of greater sensitivity to surface compliance (see Florin et al., supra). In any mode of operation, the spurious signals are reduced compared to an acoustically driven system. Thus, the present invention is of particular value for operation in the noncontact, intermittent contact and contact modes of operation.

FIG. 1 shows one arrangement for exciting motion of a cantilever by means of an acoustic wave according to the method used by Hansma et al., supra.

A flexible force-sensing cantilever 10 is attached to a rigid support 12 which, in turn, is attached to the body of the microscope (not shown). The cantilever 10, support 12 and sample-surface 14 are all submerged in a fluid 16. The fluid is chosen according to the nature of the experiment. For example, if the surface contains biological molecules, the fluid may be a physiological buffer. A transducer 18 powered by signal source 20 launches sound waves 22 into the fluid 1 6, and the waves 22 cause displacement of cantilever 10. The microscope operates by sensing changes in this displacement as the cantilever approaches a surface 14 under study. However, because the waves 22 were launched from a transducer 18 attached to a rigid boundary 14 within the fluid 16, they couple much more efficiently to other rigid objects, such as the cantilever support 12, and much less efficiently to the soft, viscously-damped cantilever 10. The consequence of this is many spurious resonances in the detector output due to motion of components in the optical detector path other than the force sensing cantilever 10 itself. The paper by Putman et al., supra, discusses the complexity of the response when the cantilever is acoustically excited.

In contrast, when excitation is applied directly to the cantilever using magnetic means in accordance with the technique taught in United States Pat. No. 5,515,719 to Lindsay entitled "Controlled Force Microscope for Operation in Liquids" and United States Pat. No. 5,513,518 to Lindsay entitled "Magnetic Modulation of Force Sensor for AC detection in an Atomic Force Microscope", the response of the detector is dominated by the cantilever motion alone as shown in FIG. 2. In FIG. 2 the amplitude of the oscillating signal (in nanometers (nm)) from the detector is plotted as a function of the frequency (in kHz) of the driving signal applied to the cantilever. The cantilever is immersed in water. The measured data points are displayed by the solid line 24. The dashed-line 26 is the calculated response for a driven-damped harmonic oscillator, corresponding to motion of the cantilever in the water. The signal is essentially free of the spurious signals observed in acoustically-excited microscopes. One consequence of this is that the sensitivity of the microscope is essentially independent of the driving frequency. FIG. 3 is a plot of the rate of fall in amplitude as the cantilever approaches the surface, half-way through its approach $((dZ/ds)_{1/2})$ as a function of the frequency (in kHz) of the driving signal. In contrast, many frequencies used in acoustic excitation produce a response that is insensitive to the approach of the cantilever to the surface (see, e.g., Putman et al., 1994, supra).

Reduction of the spurious signal arising from excitation of microscope components other than the cantilever is important for several reasons. Firstly, it results in much easier operation because the only AC signal received by the detector is that generated by motion of the cantilever itself. There is no need to hunt for a frequency at which the background is free enough of spurious signals for the cantilever signal to be found. Instead, an optimum frequency for the experiment can be chosen without regard to this factor. This optimum frequency will usually be the highest frequency at which adequate deflection of the cantilever may be obtained. Secondly, an improvement in sensitivity results because spurious background signals are eliminated. Thirdly, the increased sensitivity permits the microscope to be operated at a smaller amplitude of oscillation than would otherwise be the case (i.e., in the range of about 0.1 nm to about 10 nm instead of about 50 nm to about 1000 nm). Fourthly, because the tip-end of the cantilever is driven, the microscope is more sensitive to changes in surface compliance. (When a driving force is applied to the end remote from the tip, the deflection of the tip is sensitive to both surface compliance and the stiffness of the cantilever itself (Florin et al., supra)).

In a fluid, viscous damping greatly reduces the motion of soft cantilevers because their viscoelastic relaxation time is long so that their motion is heavily damped even at comparatively small driving frequency. Thus, increased sensitivity permits the use of both softer cantilevers and smaller amplitudes of oscillation. Since the energy in the cantilever motion (and thus the potential interaction energy with the surface) varies as the square of the amplitude of oscillation and linearly with the stiffness of the cantilever, operation with softer cantilevers at lower amplitudes results in less damage to the cantilever tip with a consequent dramatic improvement in resolution of the microscope.

OBJECTS AND ADVANTAGES OF THE INVENTION

Accordingly, it is an object and advantage of the present invention to provide an AC-AFM with enhanced sensitivity and reduced spurious oscillation of microscope components other than the cantilever itself.

It is another object and advantage of the present invention to provide sensitive yet simple detection circuitry for the microscope.

It is another object and advantage of the present invention to increase the probe tip oscillation frequency useable for AC-AFM.

These and many other objects and advantages of the present invention will become apparent to those of ordinary skill in the art from a consideration of the drawings and ensuing description of the invention.

SUMMARY OF THE INVENTION

In accordance with a first aspect of the present invention, the sensitivity of a magnetically modulated AC-AFM is substantially improved by the use of a ferrite-core solenoid for modulating the magnetic cantilever of the ACAFM. In accordance with a second aspect of the present invention, the detection system for a magnetically modulated AC-AFM incorporates AC coupling of the signal from the position sensitive detector/beam deflection detector in order to remove the DC component of the signal, resulting in significantly improved dynamic range over systems based upon DC coupling. High frequency modulation signals are detected through the use of fast analog multipliers which, after active filtering, give a low frequency signal which may be processed by digital electronics. In accordance with a third aspect of the present invention, operation of the microscope at small amplitudes of oscillation leaves small asperities on the tip intact and results in dramatic improvement in resolution.

DESCRIPTION OF THE PREFERRED EMBODIMENTS

Those of ordinary skill in the art will realize that the following description of the present invention is illustrative only and is not intended to be in any way limiting. Other embodiments of the invention will readily suggest themselves to such skilled persons from an examination of the within disclosure.

Figure 1:
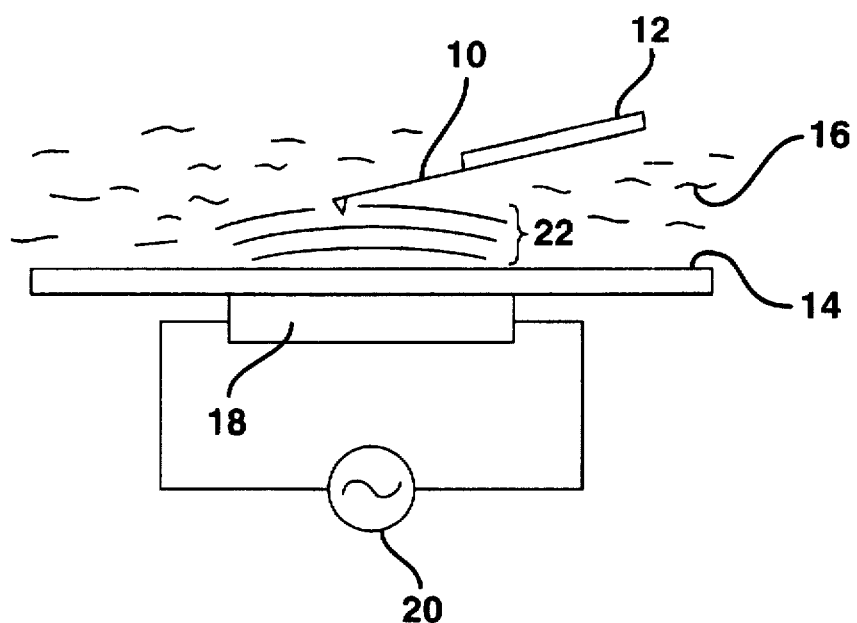
FIG. 1 is a schematic diagram of an AC-AFM showing the layout of an acoustically-excited AC-AFM operating in fluid according to the prior art.
Figure 2:
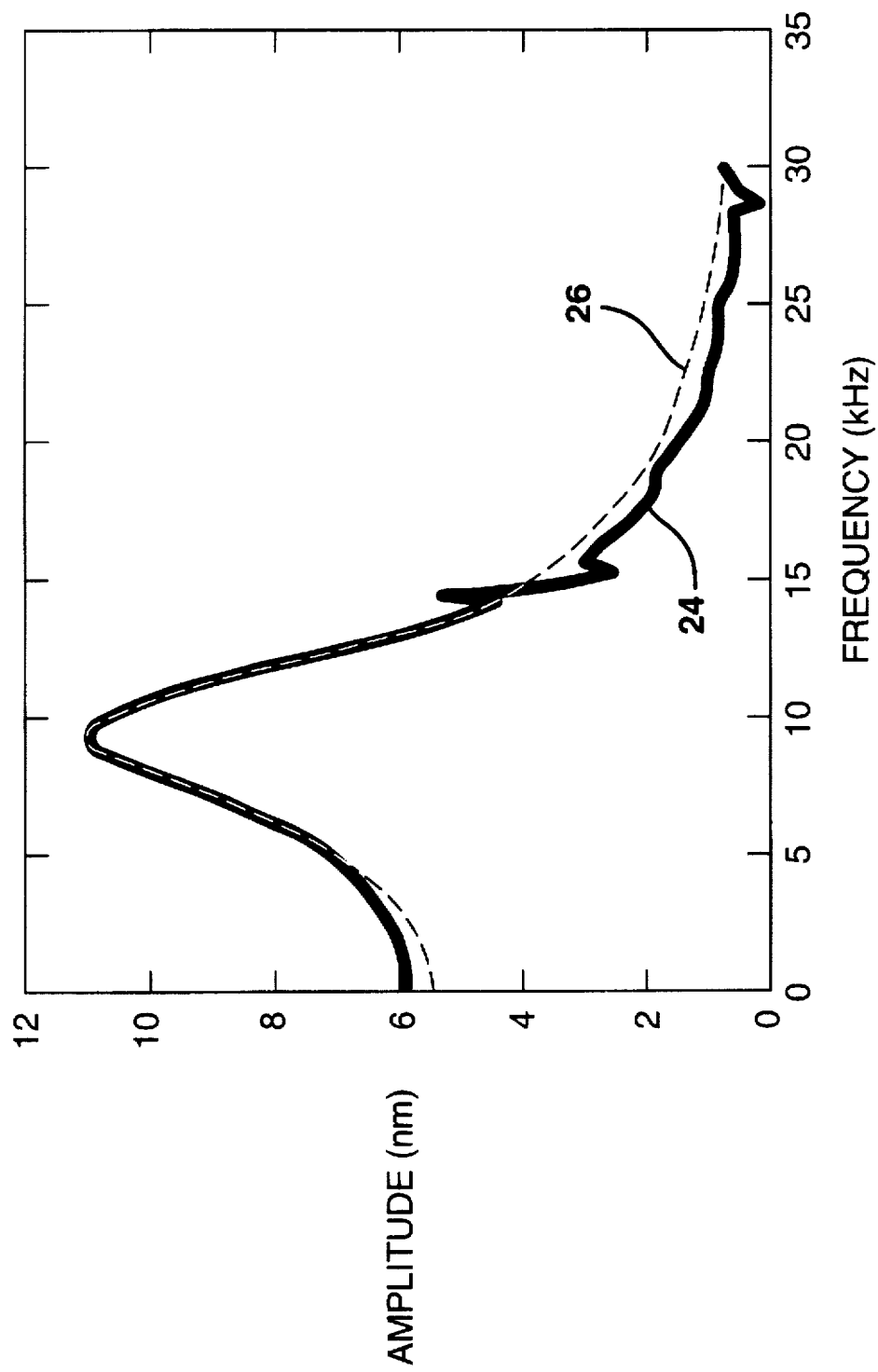
FIG. 2 is a plot showing the measured and calculated response for a cantilever driven directly by magnetic means.
Figure 3:
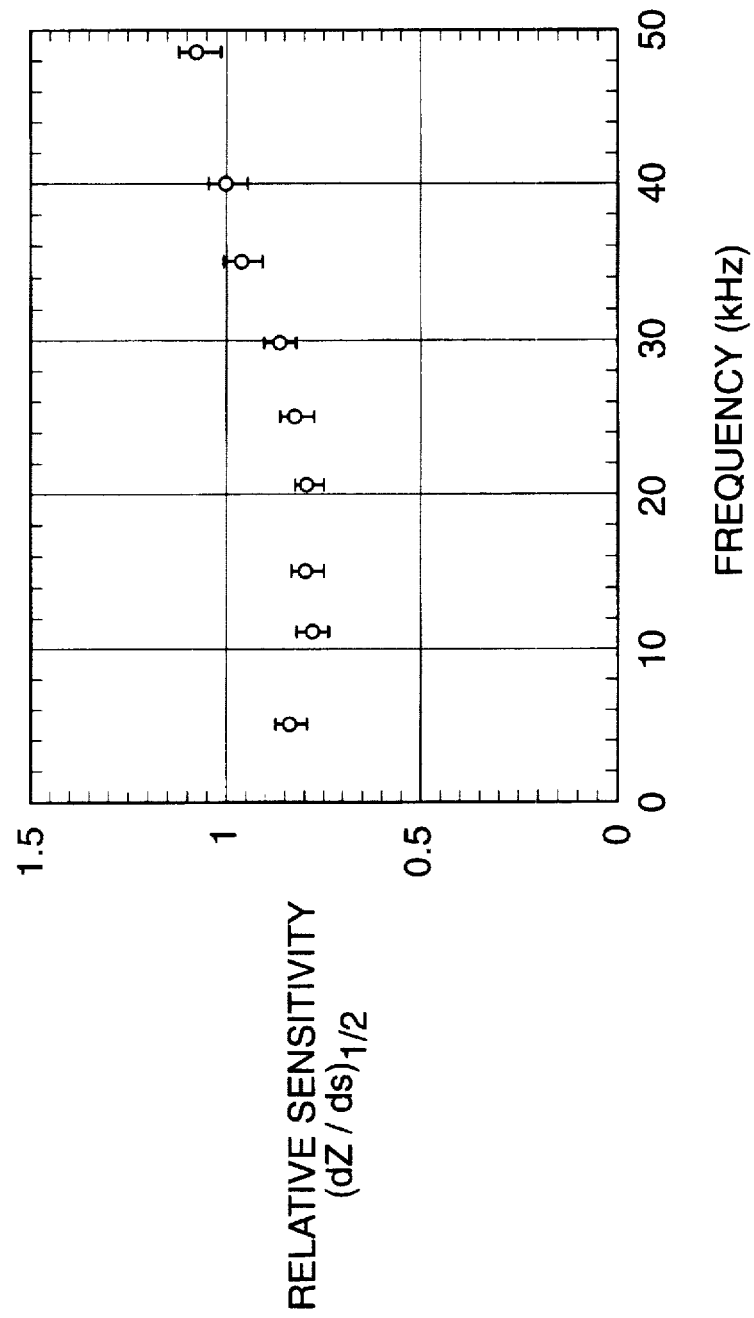
FIG. 3 is a plot showing the sensitivity of the cantilever amplitude to approach to the surface as a function of the frequency of the driving signal.
Figure 4:
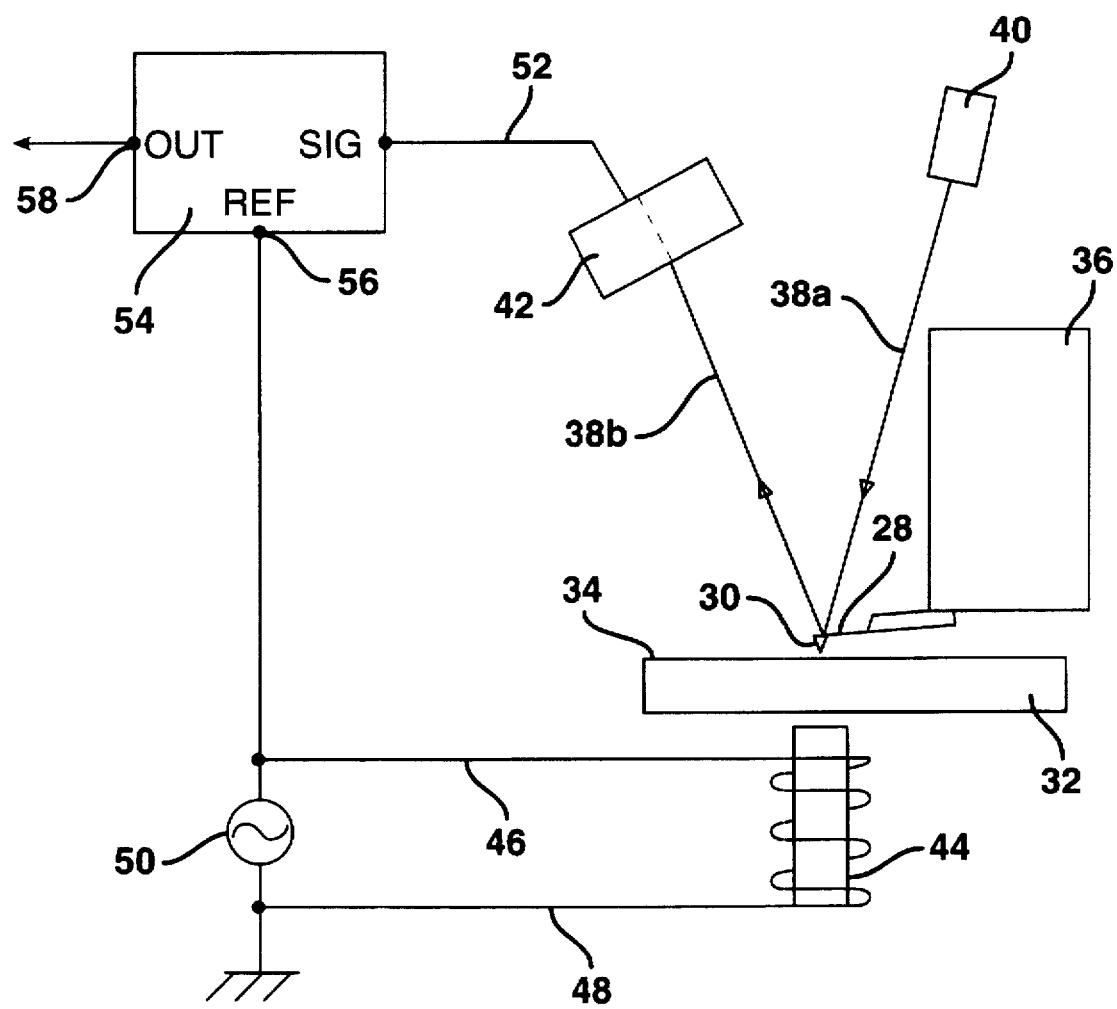
FIG. 4 is a schematic diagram showing the layout of a magnetically modulated AC-AFM. 10

The overall layout of the microscope of the present invention is described in United States Pat. No. 5,513,518. The system is summarized in FIG. 4. A magnetic cantilever 28 having an AFM probe tip 30 extending therefrom toward sample 32 is scanned over the surface 34 of a sample 32 by a piezo-electric scanner 36. Deflections of cantilever 28 are detected by directing a focussed beam of radiation 38a from a laser 40 off of reflective back of cantilever 28 to form reflected beam 38b. The angular position of beam 38b is sensed by a position sensitive detector 42. A solenoid 44 in close proximity to cantilever 28 is driven by an AC signal on lines 46, 48 from an oscillator 50. The resulting alternating magnetic field causes cantilever 28 to oscillate. This oscillating motion appears as an AC signal component in the signal on line 52 detected by position sensitive detector 42. This signal on line 52 is fed to a synchronous detector 54.

Figure 5:
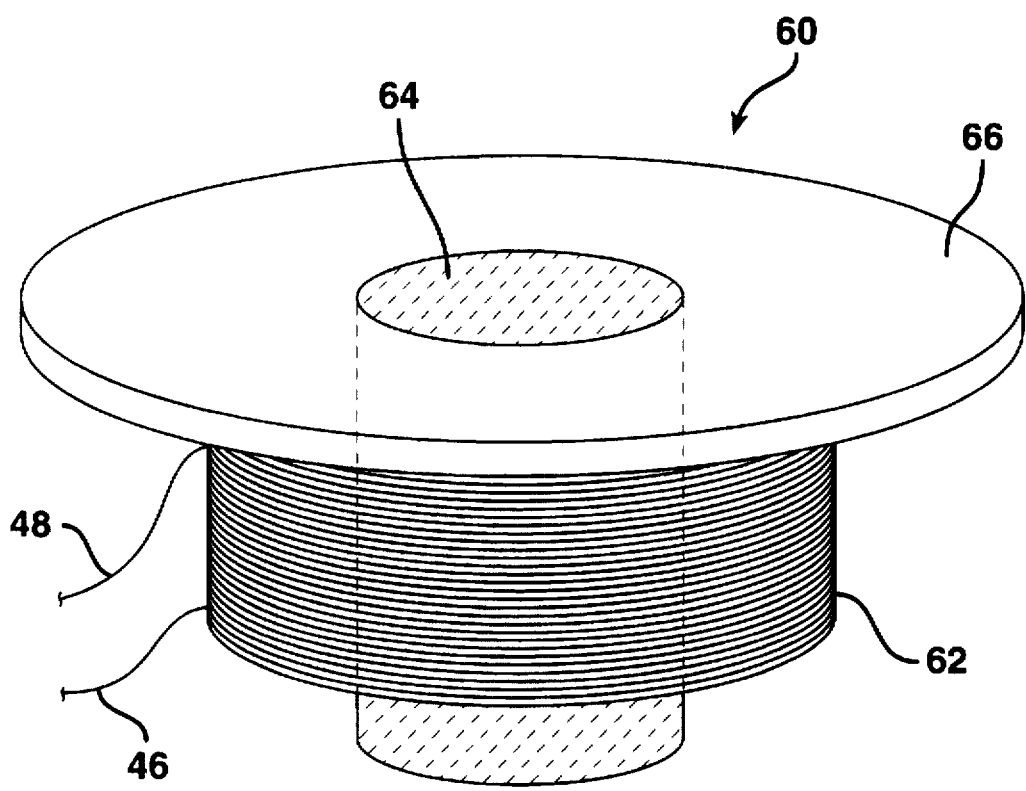
FIG. 5 shows the layout of a solenoid for use in a magnetically modulated AC-AFM in accordance with a presently preferred embodiment of the present invention.

A reference input 56 for synchronous detector 54 is provided by the same oscillator 50 that drives solenoid 44. Output 58 of synchronous detector 54 is used to control the height of cantilever 28 above the sample surface 34 and an AFM image of the surface 34 is formed from the corresponding height adjustments in a conventional manner. The solenoid described in U.S. Pat. No. 5,513,518 was fabricated using a core made from a "hard" magnetic material known as Permendur™. This material suffers from a significant remnant magnetization and can limit the degree to which cantilever 28 can be brought close to the sample surface 34 since the stray magnetization can act so as to pull cantilever 28 into surface 34. This problem is overcome in accordance with the present invention with the use of a magnetically "soft" ferrite material which permits a high AC coercivity yet has no remnant DC field. These preferred materials have the general formula $MO.Fe_2O_3$ where MO is a mixture of divalent metal oxides blended with 48 to 60 mole percent of iron oxide. Examples of the metal oxides are manganese zinc, nickel-zinc and manganese. The arrangement of a suitable solenoid 60 in accordance with a presently preferred embodiment of the present invention is shown in FIG. 5. In FIG. 5, several hundred turns of wire 62 are wound onto a ferrite core 64. The ferrite core 64 is preferably a manganese zinc ferric oxide such as Fair-Rite 77 from Fair-Rite Products Corp. of Wallkill, NY.

According to one presently preferred embodiment of the present invention, the ferrite core 64 is built into the base of a sample mounting plate 66 so that the sample to be studied may be mounted directly over the core 64. The method of modulating the cantilever disclosed in U.S. Pat. No. 5,513,518 gives a deflection proportional to the field which falls off with a length scale similar to the core diameter. Thus, with a core of several mm diameter, a sample of several mm thickness can be studied provided that the sample is, itself, non-magnetic. In the event that a magnetic sample is used, or in the event that access to the back of the sample is required, it would be straightforward for someone of ordinary skill in the art to mount the solenoid 62/64 above the cantilever 28 or in another suitable position.

Figure 6:
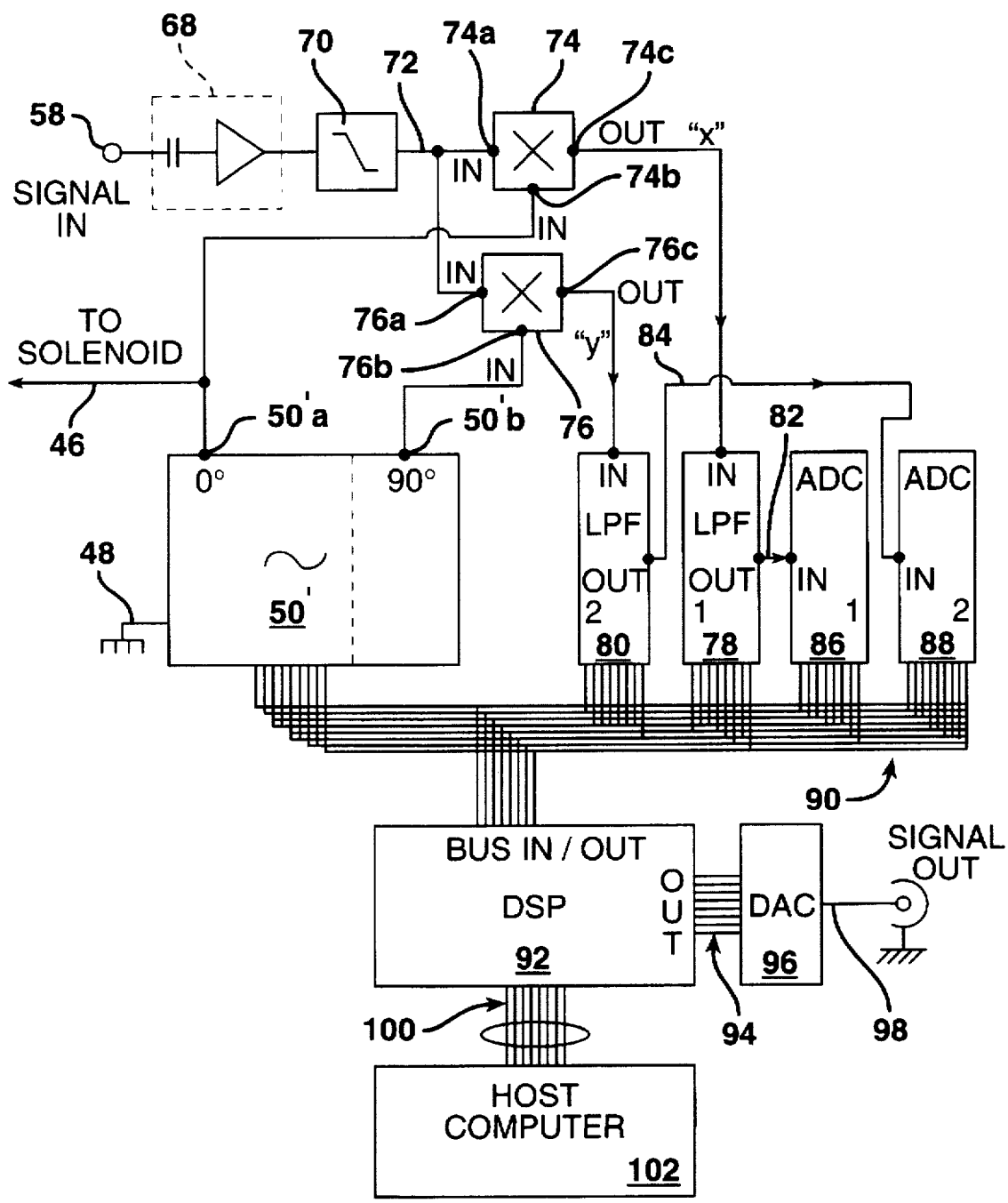
FIG. 6 is a schematic diagram of a synchronous detector system according to a presently preferred embodiment of the present invention.

A signal detection system in accordance with a presently preferred embodiment of the present invention is shown schematically in FIG. 6. The AC signal from the output 58 of detector 54 is passed through a high pass filter 68 in order to remove the relatively slowly varying background noise that arises from deflections of cantilever 28 as it passes over the surface 34. Strictly speaking, when cantilever 28 is under servo-control to maintain constant height, it undergoes no static deflections, however, servo control is usually imperfect, particularly over rougher samples, and this results in a slowly varying background signal, which is usefully removed by high pass filter 68. Filter 68 is preferably set to pass the lowest desired modulation frequency. Higher harmonics of the desired signal, generated by non-linear elements in the microscope, can cause deleterious effects by interfering with the digitization of the signal in a periodic way. These harmonics are removed by means of a digital tracking filter 70 which is preferably set to roll-off at 1.5 times the driving signal frequency of AC oscillator 50. The signal out of the tracking filter 70 on line 72 is passed to the signal inputs 74a, 76a of, respectively, two analog multipliers, 74 and 76. The reference inputs 74b, 76b of these respective multipliers 74, 76 are connected to oscillator 50' as detailed below. Oscillator 50' is preferably a digitally-programmed oscillator and phase-locked loop which provides a variable frequency signal on a 0° phase-shifted output 50a' and a 90° phase-shifted version of the 50a' output on output 50b'. The 0° phase-shifted output 50a' drives the solenoid on lines 46, 48 as before.

The digital portion of the signal available on output 50a' is readily processed to provide a second signal on output 50b' of the same frequency but shifted in phase by 90°. One of the multipliers 74 is driven by the in-phase signal from output 50a' on reference input 74b while the other multiplier 76 is driven by the 90 degree shifted signal from output 50b' on reference input 76b. The resulting in-phase (x) and quadrature (y) signals on respective multiplier outputs 74c and 76c are fed to programmable low pass filters (LPFs) 78 and 80, respectively. LPFs 78 and 80 are preferably programmed to provide the strongest possible rejection of the carrier signal (the frequency of operation of oscillator 50') while giving the maximum bandpass for the signal that corresponds to topographical variations in the sample.

The outputs on lines 82 and 84, respectively, from LPFs 78 and 80 are then fed, respectively, to analog to digital converters (ADCs) 86 and 88. The ADCs 86, 88 digitize the analog inputs from lines 82, 84 and transmit them over digital bus 90.

The digitized signals from ADCs 86, 88 are fed to a conventional digital signal processor (DSP) 92 via digital bus 90. DSP 92 processes these signals in the digital domain and then outputs the results of the processing over digital link 94 to digital to analog converter (DAC) 96 which, in turn, converts the signal back to an analog value signal on line 98 which is, in turn, used to control the height of the probe tip over the sample surface and to provide a record of the surface topology of the sample under study.

An important advantage of the present invention is that the modulation frequency of oscillator 50' is limited only by the signal path up to and including the analog multipliers. Since all of these components can easily have a bandwidth exceeding several megahertz in frequency, high frequency modulation is possible (if an adequate deflection can be obtained from the cantilever). Thus, the frequency of modulation is only limited by the cantilever mechanical properties rather than by other components of the system. Silicon nitride Microlever T force sensing cantilevers available from Park Scientific of Sunnyvale, California have been used successfully at modulation frequencies up to about 200 kHz so far.

The signals out of the LPFs 78, 80 correspond to the changes in signal due to the sample topography as it is scanned. For typical scan rates, this signal requires a bandwidth not exceeding about 100 kHz. Therefore, the remaining signal processing can be done digitally via the ADCs 86, 88 and DSP 92.

DSP 92 uses the filtered signal x from ADC 86, and its quadrature counterpart y from ADC 88 to generate a signal z which is proportional to the amplitude of the original input signal according to the formula $z=(X^2+y^2)^{1/2}$ and a signal $\phi$ in the range of 0°–180° which is proportional to the phase shift between the x and y signal according to the relation $\phi=\tan^{-1}(x/y)$. These digital signals are converted back to an analog signal by digital to analog converter (DAC) 96. This analog signal on line 98 is then fed to a feedback controller. The choice of amplitude or phase signals for feedback control and the setting of parameters within DSP 92 is preferably made using a data link 100 to a host computer 102.

Using the above-described system to image samples in water, a dramatic increase in sensitivity has been observed when compared with systems employing conventional acoustic excitation of the cantilever. The microscope can be operated at an amplitude as small as 1 nm and changes in amplitude as small as 0.1 nm can be detected. This compares with amplitudes of several tens of nm with changes of several nm for acoustically excited tapping mode in fluids.

If the oscillation level is increased or the set-point of the servo increased (i.e., the amount of decrease in amplitude or change of phase that is sought on approaching the surface of the sample) the resolution rapidly deteriorates from 1 nm to 20 nm or worse. It has been commonly believed in the SPM community that the resolution of an AFM is limited by the macroscopic radius of curvature of the probing tip, a result which continues to be true at large amplitudes of oscillation (e.g., in the range of about 10 nm to about 1000 nm). However, at small amplitudes of oscillation (e.g., in the range of about 0.1 nm to about 5 nm) made possible by the present invention, a dramatic increase in resolution has been observed with the above-described system which permits for the first time effective low amplitude AC-AFM at high frequencies. Thus, if the cantilever is oscillated at 50 nm amplitude, we find a resolution of typically 20 nm. When the amplitude is reduced to 3 nm we find a resolution of 1 nm to 2 nm can be obtained with the same cantilever.

When the amplitude of oscillation is A and the change of amplitude on interacting with the surface is $\Delta A$ then with a cantilever having a spring constant of k, the energy deposited into a tip-sample interaction on each cycle is given by $\frac{1}{2}k(A^2-(A-\Delta A)^2)$. In the example just given, the images taken at 50 nm oscillation were obtained with a change of amplitude of 5 nm, and those obtained at 3 nm oscillation were obtained with a change of amplitude of 1 nm, resulting in a hundred-fold reduction in the energy deposited into the tip-sample interaction.

Figure 7A:
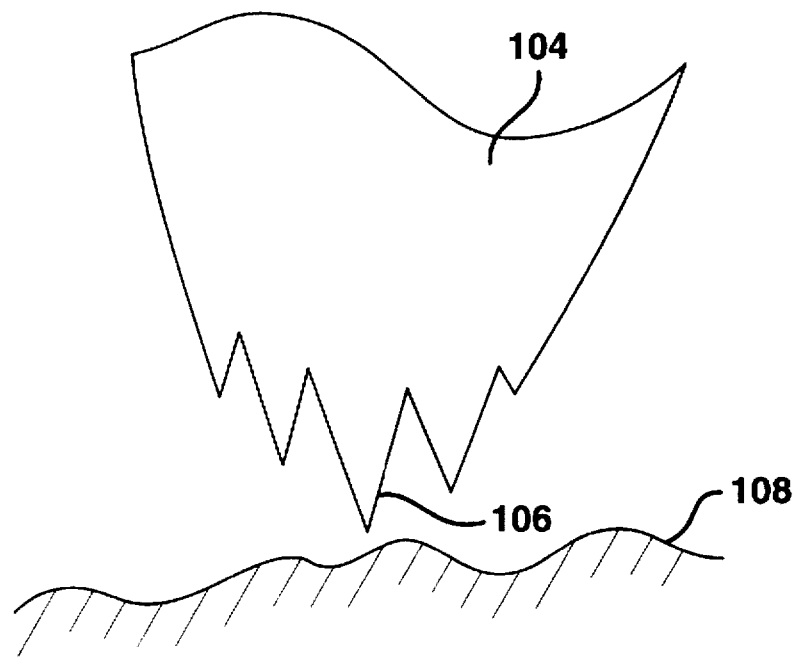
FIG. 7A shows how imaging with a small interaction energy results in high resolution AFM imaging.
Figure 7B:
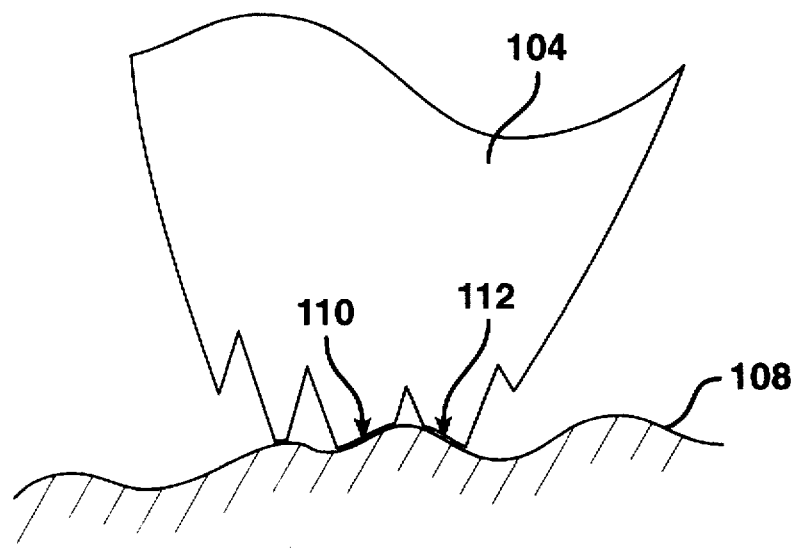
FIG. 7B shows how imaging with increased interaction energy lowers the resolution of AFM imaging due to contact interaction between the AFM probe tip and the surface under investigation.

Since the same tip was used in each case, the difference in resolution must be a consequence of damage to fine asperities on the AFM probe tip when the larger oscillation amplitudes are used. This is illustrated in FIGS. 7A and 7B. A tip 104, of nominally large radius of curvature (e.g., in the range of about 50 nm to about 100 nm), actually images by means of sharp asperities such as asperity 106 (in FIG. 7A) shown here contacting a surface 108. When a more energetic tip sample interaction occurs these asperities are crushed as shown in FIG. 7B at 110 and 112.

With the microscope described herein, DNA molecules have been imaged with a full width of the image as small as 2.7 nm on a regular basis. The highest resolution images obtained in other modes of operation have been obtained with special probe tips that have been either individually sharpened or made from a thin carbon filament. No special preparation of the probe tip was required in order to obtain the above-described results. The above-described system will produce images where an acoustically excited tapping mode AFM microscope cannot image DNA and similar molecules at all. For example, the above-described system will image molecules spontaneously adsorbed onto mica in a solution containing magnesium ions. This cannot be done using acoustically excited tapping mode, where the sample must be first dried in place.

Alternative Embodiments

Although illustrative presently preferred embodiments and applications of this invention are shown and described herein, many variations and modifications are possible which remain within the concept, scope, and spirit of the invention, and these variations would become clear to those of skill in the art after perusal of this application. The invention, therefore, is not to be limited except in the spirit of the appended claims.

What is claimed is:

1. A scanning probe microscope for generating a signal corresponding to the surface characteristics of a scanned sample surface, said microscope comprising:

a force sensing probe tip disposed on a first side of a free end of a flexible cantilever and adapted to be brought into close proximity to the sample surface;

a film including a magnetized material disposed on said flexible cantilever;

an XY scanner for generating relative scanning movement between said force sensing probe tip and the sample surface;

a Z control for adjusting the distance between said force sensing probe tip and the sample surface;

a deflection detector for generating a deflection signal indicative of deflection of said flexible cantilever;

an AC signal source; and a magnetic field generator for generating a magnetic field directed toward said second side of said flexible cantilever, said magnetic field generator coupled to said AC signal source so as to modulate said magnetic field with said AC signal and cause oscillatory movement of said probe tip, said magnetic field generator including a ferrite core solenoid.

2. A scanning probe microscope according to claim 1 wherein said ferrite core solenoid has a ferrite core formed of a material described by the chemical formula $MO.Fe_2O_3$ where MO is a mixture of divalent metal oxides blended with 48 to 60 mole percent of iron oxide.

3. A scanning probe microscope according to claim 1 wherein said ferrite core solenoid has a ferrite core including a mixture of divalent oxides selected from the group consisting of manganese zinc, nickel-zinc and manganese, blended with 48 to 60 mole percent of iron oxide.

4. A scanning probe microscope according to claim 1 wherein said ferrite core solenoid has a ferrite core including manganese zinc ferric oxide.

5. A scanning probe microscope according to claim 1 wherein said flexible cantilever, said force sensing probe tip and the sample surface are all submerged in a fluid.

6. A scanning probe microscope for generating a signal corresponding to the surface characteristics of a scanned sample surface, said microscope comprising:

a force sensing probe tip disposed on a first side of a free end of a flexible cantilever and adapted to be brought into close proximity to the sample surface;

a film including a magnetized material disposed on said flexible cantilever;

an XY scanner for generating relative scanning movement between said force sensing probe tip and the sample surface;

a Z control for adjusting the distance between said force sensing probe tip and the sample surface;

a deflection detector for generating a deflection signal indicative of deflection of said flexible cantilever;

an AC signal source;

a magnetic field generator for generating a magnetic field directed toward said second side of said flexible cantilever, said magnetic field generator coupled to said AC signal source so as to modulate said magnetic field with said AC signal and cause oscillatory movement of said probe tip, said magnetic field generator including a ferrite core solenoid; and a synchronous detector having said AC signal as a reference input and said deflection signal as a signal input, an output of said synchronous detector corresponding to the surface characteristics of the scanned sample surface.

7. A scanning probe microscope according to claims 6 further comprising:

a high pass filter connected to said output of said synchronous detector to form a first filtered output.

8. A scanning probe microscope according to claims 7 further comprising:

a tracking filter connected to said first filtered output to form a second filtered output.

9. A scanning probe microscope according to claim 8 further comprising:

a first and a second signal multiplier, signal inputs of said first and second multiplier connected to said second filtered output, a reference input of said first signal multiplier connected to said AC signal source, a reference input of said second signal multiplier connected to said AC signal source through a phase delay, a signal output of said first signal multiplier providing a signal "x" and a signal output of said second signal multiplier providing a signal "y".

10. A scanning probe microscope according to claim 9, wherein said phase delay is 90° relative to said AC signal source.

11. A scanning probe microscope according to claim 9 wherein said "x" signal is applied to a low pass filter and an analog to digital converter to form a digital-x signal.

12. A scanning probe microscope according to claim 11 wherein said "y" signal is applied to a low pass filter and an analog to digital converter to form a digital-y signal.

13. A scanning probe microscope according to claim 12 wherein a digital signal processor under control of a host computer processes said digital-x signal and said digital-y signal to form a feedback control signal used to control a parameter of the microscope.

14. A scanning probe microscope according to claim 13 wherein said parameter is the separation between said probe tip and the sample surface.

15. A scanning probe microscope according to claim 14 wherein said feedback control signal is a phase difference between a measured parameter and said AC signal source.

16. A scanning probe microscope according to claim 14 wherein said feedback control signal is a difference between a preset separation between said probe tip and the sample surface and a measured separation between said probe tip and the sample surface.

17. A scanning probe microscope according to claim 16 wherein said flexible cantilever, said force sensing probe tip and the sample surface are all submerged in a fluid.

18. A method of operating an AC-AFM, said method comprising the steps of:

providing a relative scanning movement between an atomic force microscope probe tip and a sample surface;

magnetically driving the probe tip into oscillation; and limiting the amplitude of the oscillation of the probe tip to amplitudes not exceeding 10 nm so as to prevent damage to asperities on the probe tip.

* * * * *